United States Patent [19]

Ishizuka et al.

[11] 4,413,539

[45] Nov. 8, 1983

[54] NUMERICALLY CONTROLLED LATHE

[75] Inventors: Shinichi Ishizuka; Kenji Sugimoto, both of Tanashi, Japan

[73] Assignee: Citizen Watch Company Limited, Tokyo, Japan

[21] Appl. No.: 201,847

[22] Filed: Oct. 29, 1980

[30] Foreign Application Priority Data

| | | | |
|---|---|---|---|
| Oct. 31, 1979 | [JP] | Japan | 54-140821 |
| Oct. 31, 1979 | [JP] | Japan | 54-140822 |
| Feb. 26, 1980 | [JP] | Japan | 55-22982 |
| Feb. 26, 1980 | [JP] | Japan | 55-22983 |
| Feb. 26, 1980 | [JP] | Japan | 55-22984 |
| Mar. 21, 1980 | [JP] | Japan | 55-35962 |
| Mar. 21, 1980 | [JP] | Japan | 55-35963 |
| Mar. 22, 1980 | [JP] | Japan | 55-36444 |

[51] Int. Cl.³ .................... B23B 3/18; B23B 29/32
[52] U.S. Cl. ....................... 82/2 R; 82/36 A; 29/36; 74/818
[58] Field of Search ............... 29/36, 43, 44, 45, 46, 29/47; 82/2 B, 3, 2 R, 36 A; 74/818

[56] References Cited

U.S. PATENT DOCUMENTS

| | | | |
|---|---|---|---|
| 2,652,737 | 9/1953 | Longstreet | 82/32 |
| 3,725,987 | 4/1973 | Kurimoto et al. | 29/36 |
| 3,727,493 | 4/1973 | Lahm | 82/2 B |
| 3,813,745 | 6/1974 | Kuck et al. | 82/2 B |
| 4,040,316 | 8/1977 | Gramespacher | 82/32 |
| 4,130,033 | 12/1978 | Tsuchiya | 82/3 |
| 4,180,894 | 1/1980 | Link | 29/36 |
| 4,296,657 | 10/1981 | Yasuba et al. | 82/2.5 |

*Primary Examiner*—Leonidas Vlachos
*Attorney, Agent, or Firm*—Jordan and Hamburg

[57] ABSTRACT

In a numerically controlled lathe, two guide bars are located in front of a headstock and extending parallel to the axis of a spindle to guide a saddle thereon. A cross slide is slidably supported by a guideway of the saddle to move a pair of turret heads in a direction perpendicular to the axis of the spindle. Turret indexing means allows indexing of one of the turret heads while a tool receiver fixed on the other turret head assumes in a predetermined cutting area relaive to the axis of the spindle. The saddle has a chip dropping wall formed between a guide bush and the pair of turret heads, with a front portion of the chip dropping wall downwardly slanting toward the front side of the lathe.

7 Claims, 18 Drawing Figures

NUMERICALLY CONTROLLED LATHE

This invention relates to a numerically controlled automatic lathe having two turret heads which can be independently indexed, and relates to an improved structure for the lathe to prevent cuttings entangling with tools or tool receivers.

A variety of numerically controlled automatic lathes having turret carriages are known in the art, and not a few of these have a plurality of turret heads that are employed interchangably. In the majority of these lathes, however, a turret carriage must be retracted to the starting or "home" position before a turret head can be indexed. Therefore a considerably long period of time is required to retract the turret carriage, index the turret head and then return the turret carriage to the vicinity of the workpiece whenever a tool is changed. This represents time which is not spent in actually machining the workpiece.

It is also conventional practice to equip a turret carriage having a plurality of turret heads, with independently arranged turret drive mechanisms for respective ones of the turret heads. The result is a complicated structure and a lathe of a higher cost.

It is an object of the present invention to solve the abovementioned problems encountered in the prior art and provide an inexpensive turret carriage wherein a tool for the next machining step can be indexed on one turret head while a tool on the other turret head is performing a cutting operation, thereby to greatly shorten non-machining time, and wherein only one turret drive mechanism is employed in order to simplify the overall structure.

It is another object of the present invention to provide a turret carriage driven by a hydraulic cylinder, wherein the shortest possible path for a tool can be chosen by making it possible for a turret head to rotate in both the clockwise and counter-clockwise directions, and wherein a desired tool at any point on the turret heat can be selected over the shortest possible path by just one starting and stopping operation by making it possible to rotate the turret head by an amount equivalent to a plurality of indexing steps with just one starting operation.

It is a further object of the present invention to provide a tool spindle driving device for use in a lathe adapted so as to permit a tool spindle to be detachably mounted on a turret head provided with other tools as well, which tool spindle driving device permits the use of a turret head having a shape that does not necessitate needless machining in a case where the lathe is not intended for compound machining.

It is a still further object of the present invention to provide an improved structure for a numerically controlled lathe, whereby chips and cuttings resulting from machining fall onto the chip dropping wall which is formed between the guide bush and the turret carriage and which is inclined downwardly toward the front side of the lathe, so that the chips drop away from the lathe naturally and do not scatter on the slide surface of the saddle.

It is a still further object of the present invention to provide a driving device for a rotary guide bush having a simple construction and capable of withstanding high-speed lathe operation.

The present invention will now be described in connection with the accompanying drawings.

Figure 1:
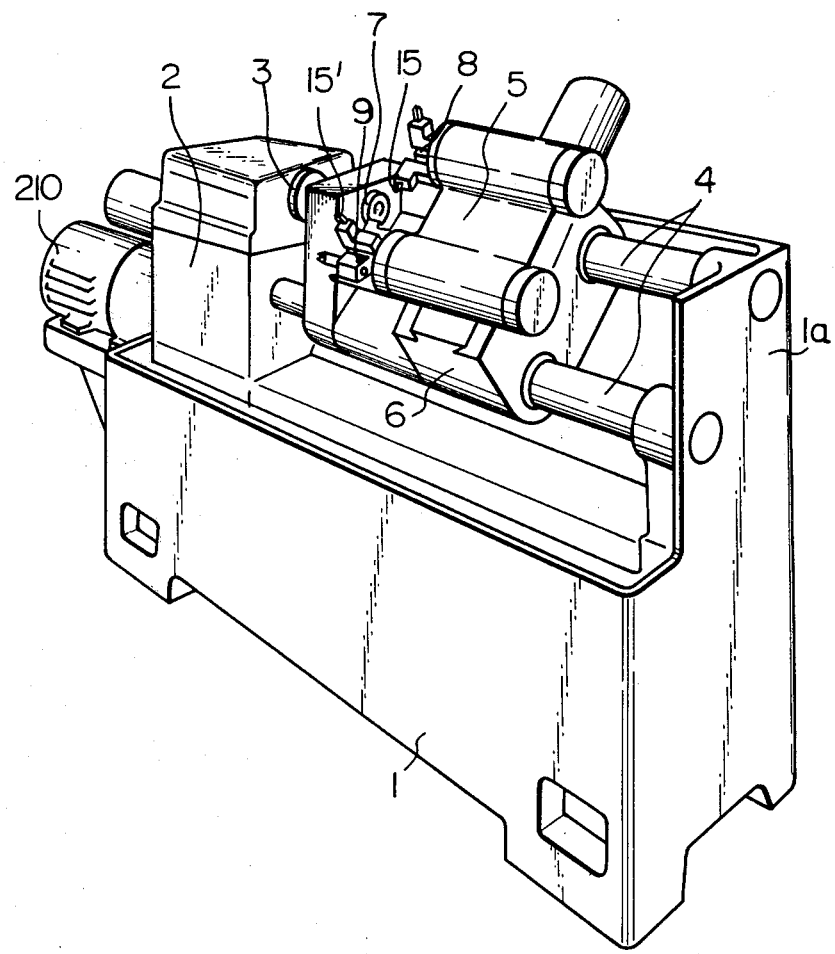
FIG. 1 shows an example of a numerically controlled automatic lathe according to the present invention.

FIG. 1 shows an example of a numerically controlled automatic lathe having a turret carriage in accordance with the present invention. Disposed on the upper portion of a bed 1 at the left-hand side thereof is a headstock 2 that supports a spindle 3 for rotation. The bed 1 has a side wall 1a at the upper end of its right-hand side which cooperates with the headstock 2 to fixedly support two parallel guide bars 4 which extend from the headstock to the side wall and which lie in parallel with the spindle 3. The guide bars 4 support a saddle 6. A turret carriage comprises a closs slide 5 which has two indexable turret head 8, 9 each of which holds a plurality of cutting tools by means of tool receivers. The arrangement of the present embodiment includes a guide bush 7 provided between the headstock 2 and the turret carriage 5 in a coaxial relationship with the spindle, and permits slender articles to be machined to a high precision. The guide bush 7 is secured to a guide bush supporting portion of the saddle 6 and slides together therewith in the longitudinal direction.

FIGS. 2 through 6 show an embodiment of the turret carriage and the associated drive mechanism according to the present invention.

The cross slide 5 is guided along a dovetail groove in the upper surface of the saddle 6 so as to be slidable in a direction which is perpendicular to the spindle. Suitable drive means such as a servo motor and feed screw driven thereby are provided for the saddle 6 to transport it longitudinally and for the cross slide 5 to transport it transversely, that is, in the direction perpendicularly crossing the longitudinal direction.

The two turret heads 8, 9 are provided on the cross slide 5, as shown in FIG. 1. The cross slide 5 is provided with a bore which lies in parallel with the spindle 3, the bore receiving and slidably supporting a turret revolving shaft 12. Formed at the front end (the spindle side) of the turret revolving shaft 12 are the turret heads 8, 9 (on responsive turret revolving shafts) having five tool mounting faces 8a, 9a on which required tools such as cutters 15, 15' and drills 16, 16' may be mounted through tool receivers 13, 14, respectively. The turret revolving shaft 12 is hollow and rotatably receives a tool spindle drive shaft 17 whose front end has a driving bevel gear 18 that meshes with a driven bevel gear 20 on a tool spindle 19. Provided at the posterior extremity of the tool spindle drive shaft 17 is a pulley 21 which receives the rotational driving force of motor 22 by means of a motor pulley 23 and a belt 24, the pulley 21 rotating the tool spindle drive shaft 17 which in turn rotatively drives a rotary tool for secondary machining, such as the drill 16 for boring a transverse hole through a half-finished workpiece.

The turret revolving shaft 12 has at its posterior end portion a gear 25 that is engagable with and disengagable from an axially slidable driving gear 27 which is provided at the posterior end portion of a rotatable turret drive shaft 26 that lies in parallel with the turret revolving shaft 12. The number of teeth on the gear 25 is an integral multiple of the number (five in the present embodiment) of tool mounting faces 8a, 9a on the respective turret heads 8, 9. Hence, when the turret heads 8, 9 are positioned, the tooth profile of the gear will always assume the same phase when the turret heads come to rest. The turret drive shaft 26 has at its posterior extremity a cam plate 46, shown in more detail in FIG. 4, having circumferentially angularly spaced apart projections each of which corresponds to an indexing angle of the turret heads 8, 9. A suitable detector such as a proximity switch 47 is provided and so adapted as to detect the projections of the cam plate 46 to enable detection of the indexing steps of the turret head and the like.

The central portion of the turret drive shaft 26 has a gear 29 which meshes with a rack 28 that is driven by a hydraulic cylinder 30 which will be described later. The arrangement is such that actuating the hydraulic cylinder 30 with the gears 25, 27 in the meshing state rotates the turret revolving shaft 12 via the rack 28, gear 29, gear 25 and gear 27.

Figure 2:
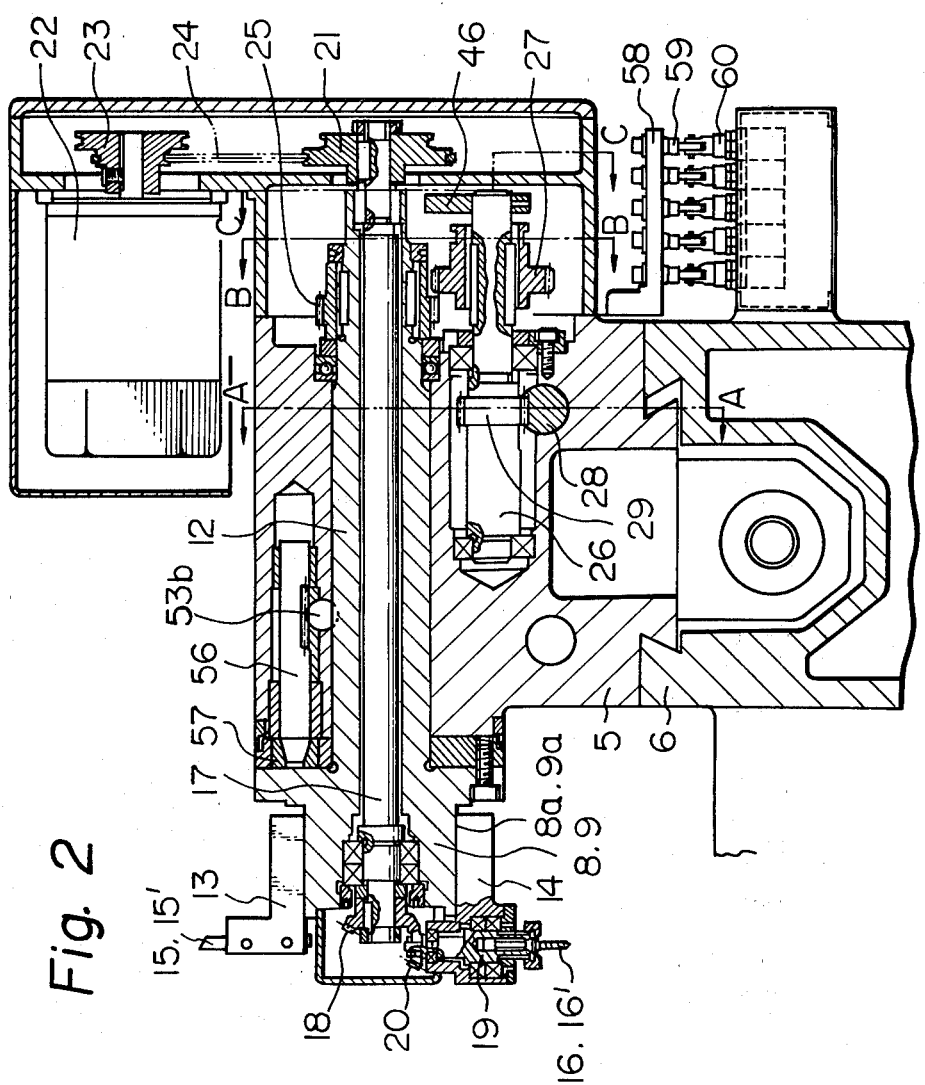
FIG. 2 shows a cross-sectional view of the lathe shown in FIG. 1.
Figure 3:
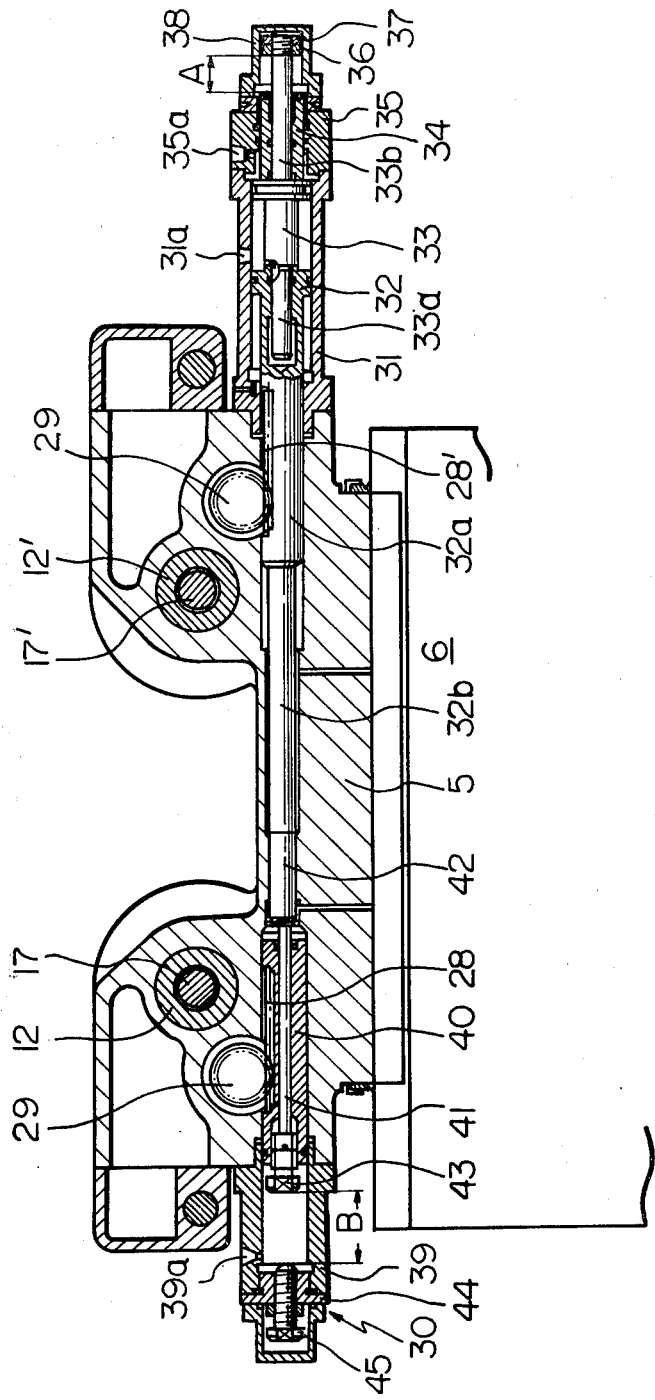
FIG. 3 shows a cross-sectional view taken along the line A—A of FIG. 2.

FIG. 3 is a cross-sectional view of FIG. 2 taken along the line A—A, and it shows in detail the hydraulic cylinder 30 mentioned above. Since the present embodiment is provided with two turret heads 8, 9 as set forth above, an apostrophe (') will be affixed to the reference numerals associated with the turret head 9 of the turret revolving shaft on the right-hand side of the drawing in order to distinguish between the two sets of component parts. Thus, the two turret revolving shafts will be noted 12 and 12', respectively. In FIG. 3, a first cylinder 31 which slidably receives a first piston 32 is fixedly provided on the right-hand side of the cross slide 11. The rack 28' mentioned above is formed on a piston rod portion 32a extending leftwardly from the piston 32, and it meshes with the gear 29'. Extending leftwardly from the piston rod portion 32a is a rod portion 32b of a smaller diameter. The first cylinder 31 slidably receives a second piston 33 as well. The first piston 32 has a hollow portion in the right-hand end thereof that receives a rod portion 33a on the left-hand end of the second piston 33, in which state the end face on the right-hand end of the first piston 32 is in abutting contact with the shoulder portion on the left-hand end of the second piston 33. Fixedly secured to the right-hand end of the first cylinder 31 is an end block 35 into which a hollow second stopper 34 is screwed. The second stopper 34 abuts against the shoulder portion on the right-hand side of the second piston 33 to prevent the latter from being advanced any further to the right. Passing through the hollow portion is a rod 33b provided on the right-hand side of the second piston 33. Screwed onto the right-hand end of the rod 33b is a third stopper 36 which abuts against the right-hand side of the second stopper 34 to restrict the leftward movement of the second piston 33. A nut 37 serves to lock the second stopper 34, and a cap 38 is screwed on the second stopper 34 to protect the piston rod 33b.

A second cylinder 39 is fixedly provided on the left-hand side of the cross slide 11. A bore located in the second cylinder 39 and a bore communicating therewith located in the cross slide 11 slidably accommodate a third piston 40. The third piston 40 is formed to include the rack 28 at the central portion thereof, which rack meshes with the gear 29 as described above. In order to adjust the position at which the rack 28 and gear 29 mesh (that is, in order to adjust the tooth profile phase), an adjustment screw 41 is passed through the center of the third piston 40, the leading end of the adjustment screw in effect abutting against the rod 32b of the first piston 32 through an intermediate rod 42. The adjustment screw 41 has a locking bolt 43 whose end face on the left-hand side thereof serves also as a stopper seat for a first stopper 45 screwed in an end block 44 provided on the left-hand end of the second cylinder 39.

The hydraulic cylinder 30 having the above construction forms a three-position stopping cylinder. FIG. 3 shows a first position, namely one in which the racks 28, 28' are positioned as far to the right as possible. In the state shown, pressurized oil has been introduced from an inlet port 39a formed in the second cylinder 39, thereby driving the third piston 40 to the right to advance the first piston 32 and second piston 33 in the same (right-ward) direction via the intermediate rod 42. Piston movement stops when the shoulder portion of the second piston 33 abuts against the left-hand end face of the second stopper 34. Since the effective cross-sectional area of the first cylinder 31 is sufficiently greater than that of the second cylinder 39, a superior force that acts to drive the second piston 33 to the left is produced when, with the hydraulic cylinder stopped in the first position, pressurized oil is introduced from an inlet port 35a which is provided in the end block 35. The second piston 33 will therefore be driven to the left by a distance A, namely until the third stopper 36 abuts against the second stopper 34. This stopping position is referred to as a second position and it is here that the racks 28, 28' stop after having been driven to the left by the distance A. If the pressurized oil is again introduced, this time from an inlet port 31a provided in the first cylinder 31, only the first piston 32 will be driven further to the left until the left-hand end of the locking bolt 43 abuts against the first stopper 45. This is referred to as the third position. The racks 28, 28' are thus driven further to the left together with the first piston 32. If the total stroke B is made equal to 2A, that is, if the racks, 28, 28' are driven by fixed stroke A between the first and second positions and between the second and third positions, and if the arrangement is such that the turret heads 8, 9 are rotated by each stroke A of the racks through an angle equivalent to one indexing step, then the heads 8, 9 can be indexed by an amount equivalent to one or two steps in the forward or reverse direction by driving the hydraulic cylinder 30 to the right or left by a distance A or B when the gears 25, 27 are meshing with each other.

If the stoppers 34, 36, 45 and the adjustment screw 41 are adjusted in such a manner that the turret heads 8, 9 will stop at the correct tool position for each of the first, second and third stopping positions of the hydraulic cylinder 30, then the gears 25, 27 will be freely engagable and disengagable without their tooth profiles interfering with one another, this following from the arrangement described above wherein the phase of the gear 25 is fixed at all times when the turret heads 8, 9 are positioned, that is, when a tool on the respective turret heads has been indexed to the machining position.

Since the turret heads 8, 9 in the present embodiment have five tool mounting faces 8a, 9a, respectively, it is obvious that any tool mounted on a turret head can be selected if the turret head is capable of being rotated in either the forward or reverse direction by an amount needed to index the turret one or two tool positions. Similarly, for a turret head having n-number of tool mounting faces (where n is any odd number), any tool can be selected if the turret head is capable of being rotated in the forward or reverse direction by an amount needed to index the turret head by from one to $(n-1)/2$ tool positions. Furthermore, the hydraulic cylinder which is utilized should have $(n+1)/2$-number of stopping positions inclusive of the position at which the cylinder is stopped at any given time. Likewise, if n is an even number, the turret head must be capable of being rotated by a maximum of n/2 tool positions, and the number of hydraulic cylinder stopping positions must be $(n/2)+1$. Adopting such an arrangement permits any tool to be selected in the manner described above, but this results in a somewhat lower efficiency since a tool displaced from the machining position by 180 degrees cannot be selected over a shorter path even though the turret head is rotatable in both the forward and reverse directions.

Figure 4:
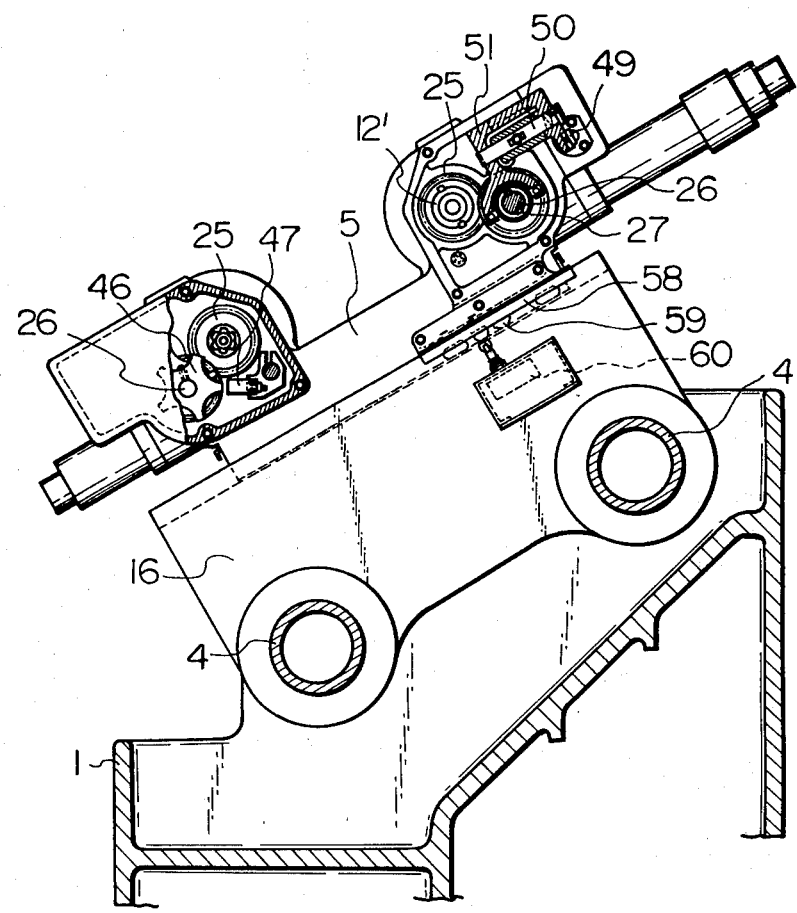
FIG. 4 shows a right-hand side view with a portion cut away, of the lathe shown in FIG. 1.
Figure 5:
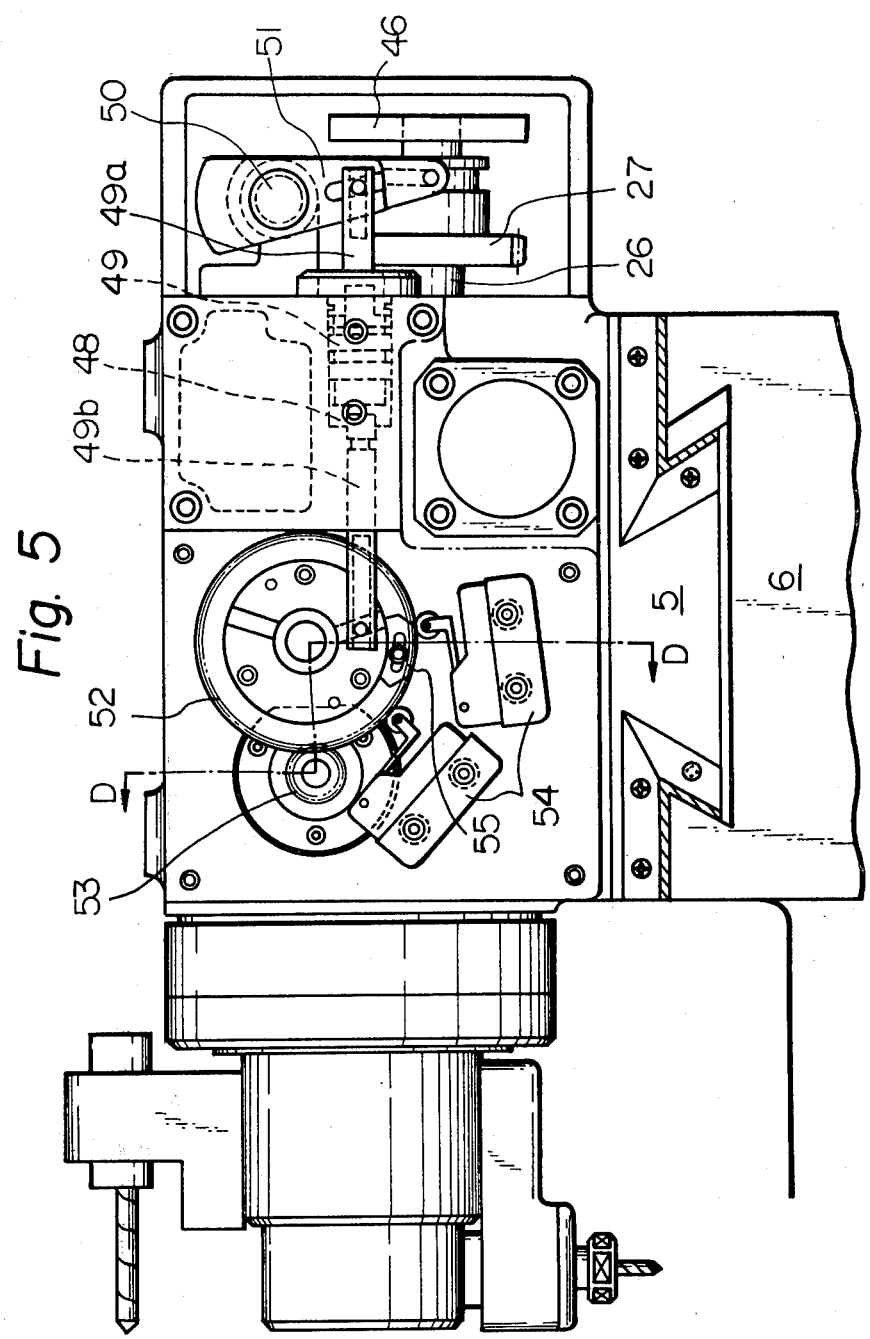
FIG. 5 shows a front view of the lathe shown in FIG. 1.

FIG. 4 is a side view of the present embodiment as seen from the right-hand side. The turret carriage on the right side of FIG. 4 (the back side of the lathe in FIG. 1) is shown in section taken along the line B—B of FIG. 2, and the turret carriage on the left side of FIG. 4 (the front side of the lathe in FIG. 1) is shown in section taken along the line C—C of FIG. 2. FIG. 5 is a front view.

Provided at the posterior extremity of the turret drive shaft 26 is the cam plate 46 having the angularly spaced apart projections corresponding to the indexing angles of the turret head. A suitable detector such as the limit switch 47 is adapted to detect the projections to enable detection of the angle of rotation of the turret drive shaft 26. Since the teeth on the gears 27, 25 agree in number in the present embodiment, the projections on the cam plate 46 are five in number, this agreeing with the number of tool positions on the turret head. It goes without saying that the cam plate 46 can be provided on the turret revolving shaft 12, with the number of projections agreeing with the number of tool positions.

As described above in connection with FIG. 2, the axially slidable driving gear 27 is provided on the turret drive shaft 26 and meshes with the gear 25 provided on the turret revolving shaft 12 so as to rotate the turret head. In FIG. 5, a cylinder 48 provided on the cross slide 11 slidably accommodates a piston 49. Actuating the piston 49 causes a piston rod 49a to pivot a lever 51 about a pivot point 50, whereby the driving gear 27 is slidable along the turret drive shaft 26. The driving gear 27 thus is engaged with or disengaged from the gear 25 by the action of the piston 50 and lever 51.

The piston 49 has a piston rod 49b at the other end thereof for turning a piston 53 through an oscillating gear 52. Limit switches 54 make contact with a cam member 55 provided on the oscillating gear 52 and are adapted to deliver signals for inserting or withdrawing a positioning pin, as will be described below.

Figure 6:
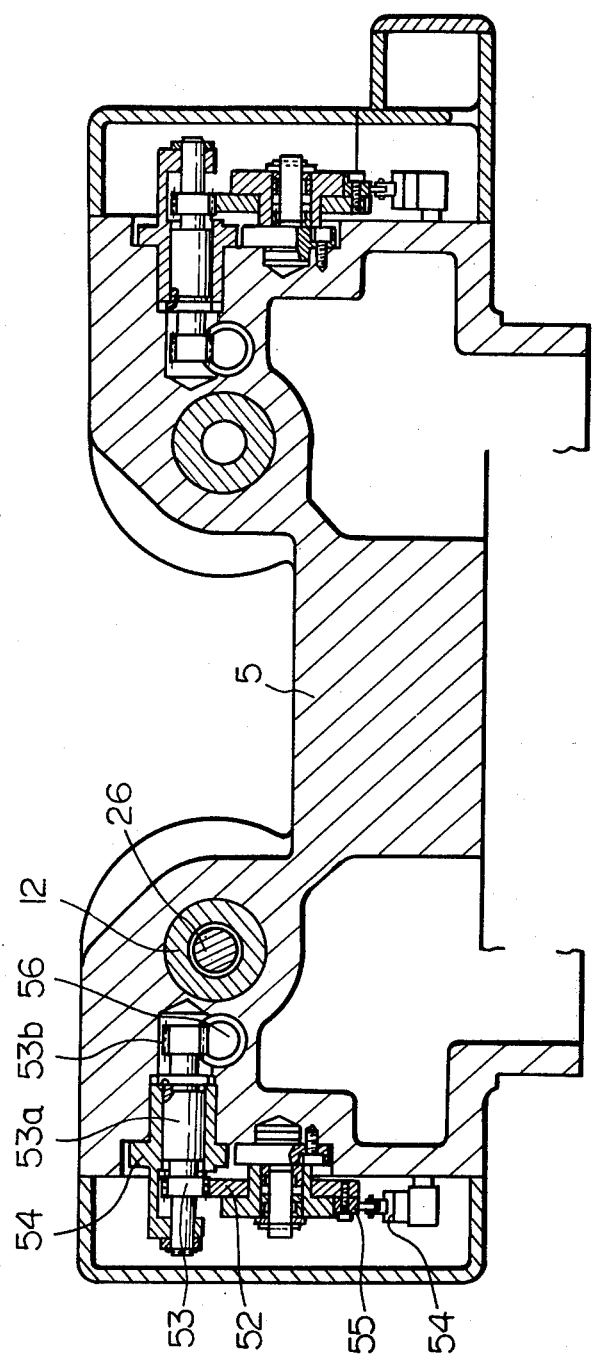
FIG. 6 shows a cross-sectional view of FIG. 5 taken along the line D—D.

FIG. 6 is a cross-sectional view of FIG. 5 taken along the line D—D. In FIG. 6, the other end of pinion 53 forms a pinion 53b which meshes with a rack 56a on a positioning pin 56, the central portion 53a of the pinion 53 being rotatably supported. The positioning pin 56 is provided on the cross slide 11 and slidable in a direction parallel to the turret revolving shaft 12, and is adapted to be inserted into or withdrawn from a plurality of positioning bushes 57 provided on each of the turret heads 8, 9 at positions corresponding to the tool positions thereof. In FIG. 2, the positioning pin 56 is shown situated above the turret revolving shaft 12. It should be noted, however, that this is an expedient for the preparation of the drawings, and that the positioning pin 56 is actually located at the side of the turret revolving shaft 12, as shown in FIG. 6, the pinion 53b meshing with the rack from above. Accordingly, when the piston 49 is driven to the right, the positioning pin 56 is driven to the left and penetrates the positioning bush 57 thereby to position the respective turret 8 or 9.

Referring to FIGS. 2 and 4, a mounting plate 58 fixedly provided on the cross slide 11 has a plurality of dogs 59 which engage and actuate a plurality of limit switches mounted on the saddle 10. This allows the position of the cross slide 11 to be detected, and permits the slide stock to be positionally controlled.

The turret tool rest of the present invention operates in the following manner. It will first be assumed that a tool on the turret head 8, which is on the front side of the lathe, is performing a machining operation, and that the turret head 9 on the back side of the lathe is to be indexed and prepared for the next machining step.

(1) The positioning pins 56 for both turret heads 8, 9 are being received by the respective positioning bushes 57. Hence the driving gear 27 is at the leftward side of its stroke, the driving gear 27 being provided on the turret drive shaft 26 which is operated by the piston 49 and the single driving source. The driving gear 27 therefore is not meshing with the gear 25 on the turret revolving shaft 12. Under these conditions the hydraulic cylinder 30 is moved to a prescribed position, say the first position described above. The turret heads are not rotated by this operation since the gears 25 and 27 are not in a meshing state.

(2) The piston 49', for the turret head 9 on the back side of the lathe, is driven to the left, thereby withdrawing the positioning pin 56' and meshing the gears 25', 27'.

(3) The hydraulic cylinder 30 is actuated and moved to another position, say the third position. This rotates the turret head 9 counter-clockwise by an amount equivalent to two indexing steps.

(4) The piston 49' is driven to the left to disengage the gears 25', 27' and to insert the positioning pin 56' in the positioning bush 27', thereby to position the turret head.

The above operation rotates the turret head 9 by the prescribed angle (counter-clockwise by an amount equivalent to two indexing steps in the present embodiment), thereby completing the selection of the desired tool. During this operation, the machining being performed by the tool mounted on the turret head 8 continues without interruption. When this tool has completed its machining work, the cross slide 11 is immediately advanced to the front of the lathe (to the left in FIG. 3), thereby to bring the selected tool on the turret head 9 to the machining position so that the next machining step can be carried out.

The turret carriage of the present invention having the structure described above and operating in the abovesaid manner exhibits the following effects.

(1) The time required for the indexing of tools is shortened since a desired tool can be selected by just one starting and stopping operation.

(2) Since one turret head can be indexed while a tool mounted on the other turret head is performing machining work, the machining work is interrupted only for the period of time needed to move the other turret head into position by sliding the cross slide. This greatly shortens non-machining time.

Figure 7:
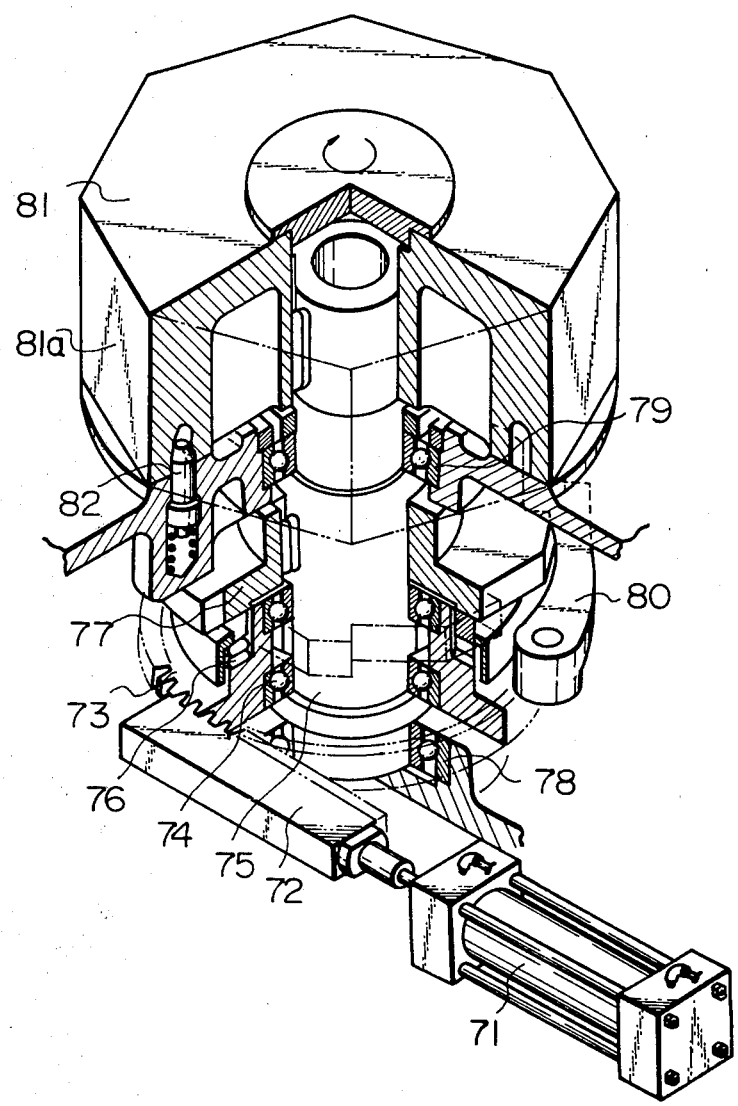
FIG. 7 shows a perspective view showing an example of turret head indexing mechanism using a hydraulic cylinder according to the prior art.

FIG. 7 shows a perspective view showing an example of turret head indexing mechanism using a hydraulic cylinder according to the prior art. A hydraulic cylinder 71 reciprocates a rack 72 to rotate a gear 73 which meshes with the rack. The gear 73 supported in a bearing 74 is rotatable about a center shaft 75 and coupled to a ratchet wheel 77 through a one-way clutch 76. The ratchet wheel 77 is secured to the center shaft 75, which is journalled in bearings 78, 79, and is rotatable together with the shaft. The teeth on the outer periphery of the ratchet wheel 77 engage with a pivotable ratchet pawl 80 which is urged toward the center shaft 75, the ratchet wheel 77 being rotatable in the prescribed direction only, by virtue of the pawl 80 which prevents rotation in the direction opposite thereto. Provided at the upper end of the center shaft 75 is a turret head 81 having a tool mounting face 81a (the details of which are omitted from the drawing) on which a tool such as a cutter is mounted through a tool receiver. The turret head 81 is capable of rotating together with the center shaft 75 and is both secured and positioned by a withdrawable positioning pin 82.

When the positioning pin 82 is withdrawn and the rack 72 is advanced by the hydraulic cylinder 71, the gear 73 meshing with the rack is rotated in the clockwise direction thereby to rotate the turret head 81 in the same direction through the ratchet wheel 77 which is coupled to the gear 73 by the one-way clutch 76, and through the center shaft 75 to which the ratchet wheel is secured. When the turret head 81 has rotated through a prescribed angle (the indexing angle of the turret), the piston within the hydraulic cylinder 71 is retracted. However, since the ratchet pawl 80 engages with the next tooth on the ratchet wheel 77 to prevent it from rotating in the opposite direction, the one-way clutch 76 runs idle so that only the rack 72 and the gear 73 meshing therewith reverse direction and return to their original positions. This operation is performed once or is repeated a number of times until the desired tool arrives at the machining position. When this has been accomplished the positioning pin 82 is inserted into the turret head 81 to accurately position and secure it. This completes the turret head indexing operation.

In accordance with the foregoing common structure of the turret head indexing mechanism driven by the hydraulic cylinder, turret head rotation is possible in one direction only, and the turret comes to a stop each time it is indexed by one step. This means that the mechanism must be started and stopped a number of times in order to select a tool which is remote from the machining position.

On the other hand, the present invention can provide a turret head indexing mechanism driven by a hydraulic cylinder, wherein the shortest possible path for a tool can be chosen by making it possible for a turret head to rotate in both the clockwise and counter-clockwise directions, and wherein a desired tool at any point on the turret head can be selected over the shortest possible path by just one starting and stopping operation by making it possible to rotate the turret head by an amount equivalent to a plurality of indexing steps with just one starting operation, as described hereinbefore.

Figure 8:
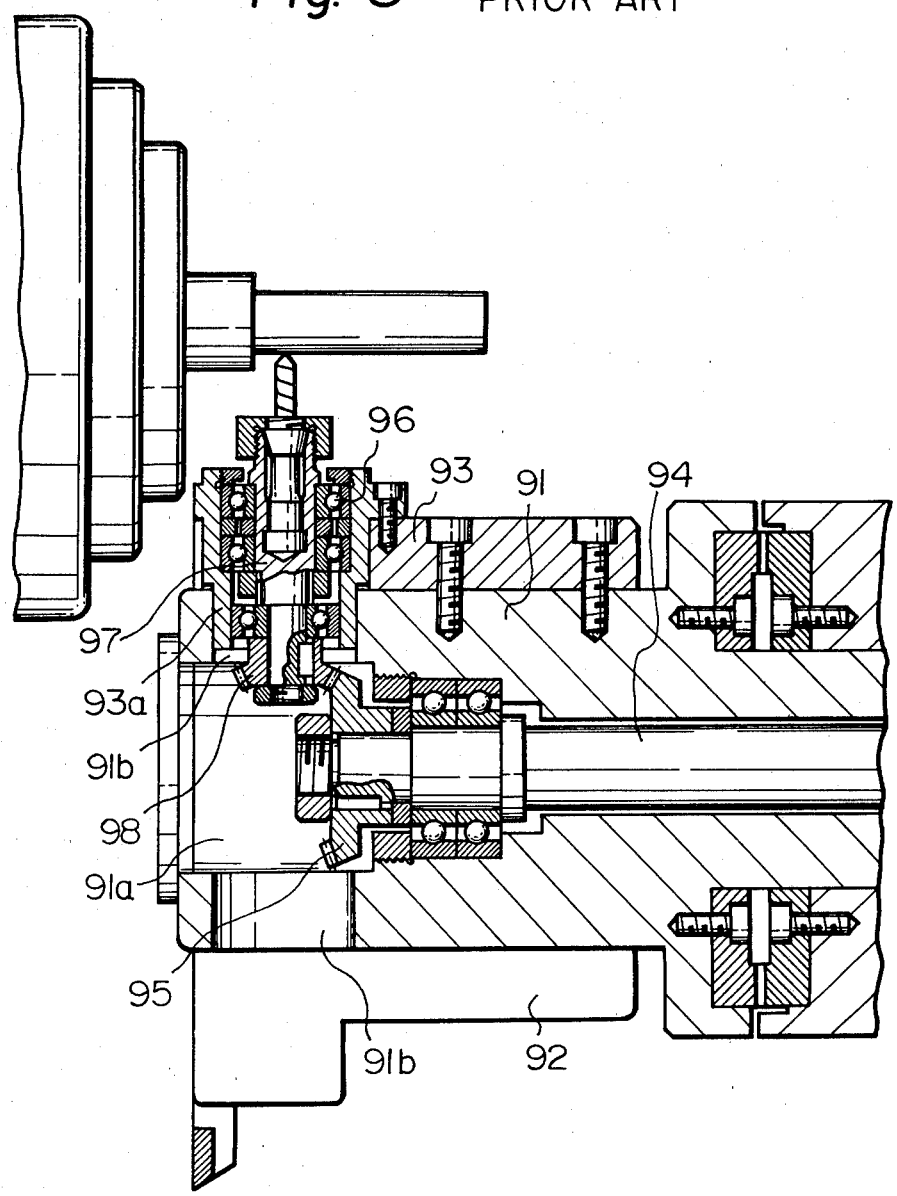
FIG. 8 shows a cross-sectional view of a tool spindle driving device according to the prior art.

In FIG. 8, a tool spindle holder 93 can be provided together with a lathe tool holder 92 and detachably mounted on the outer periphery of a turret head 91. The turret head 91 accommodates internally a tool spindle drive shaft 94 disposed along the axis of rotation of the turret head, which drive shaft has a driving bevel gear 95 fixedly mounted at its front end. The gear 95 is located in a cavity 91a formed within the turret head 91. The tool spindle holder 93 holds a rotatable tool spindle 97 which is journalled by bearings 96 on an axis that is perpendicular to the axis of rotation of the turret head 91, and which is equipped with a shaft portion 93a coaxial with the tool spindle 97. The arrangement is such that a hole 91b provided beforehand in the turret head 91 receives the shaft portion 93a so that one end of the tool spindle 97 may extend into the cavity 91a. Fixedly mounted at this end of the tool spindle 97 is a driven bevel gear 98 that meshes with the driving bevel gear 95 so that the rotational motion of the tool spindle drive shaft 94 may be transmitted to the tool spindle 97.

In accordance with the tool spindle driving device of the abovesaid type, the tool spindle drive shaft 94 and driving bevel gear 95 are not installed when a compound machining operation is unnecessary, so that the turret head 91 can be used exclusively as a tool rest for lathe work. On the other hand, when compound machining is required in accordance with the shape of the half-finished workpiece, the tool spindle drive shaft 94 is installed and the tool spindle holder 93 is mounted or demounted as required, thereby allowing the prescribed compound machining operation to be carried out. This is a very convenient arrangement. It should be noted, however, that the turret head 91 must be subjected to machining work to provide the hole 91b regardless of whether or not the turret head 91 will ever be used for compound machining. This represents meaningless labor in a case where the turret head 91 is employed exclusively as a lathe tool rest, as may be the case if compound machining is not reuired. In other words, the turret head 91 must be constructed of high-precision parts in order to maintain its indexing accuracy, and additional work by means of a jig boring machine or the like is required for the machining of the hole 91b. This extra machining work has a major influence on the time which is needed to work the parts that comprise the turret head; eliminating this extra machining work will permit a reduction in the total machining time.

On the contrary, the present invention can provide a tool spindle driving device for use in a lathe adapted so as to permit a tool spindle to be detachably mounted on a turret provided with other tools as well, which tool spindle driving device permits the use of a turret head having a shape that does not necessitate needless machining in a case where the lathe is not intended for compound machining.

Figure 9:
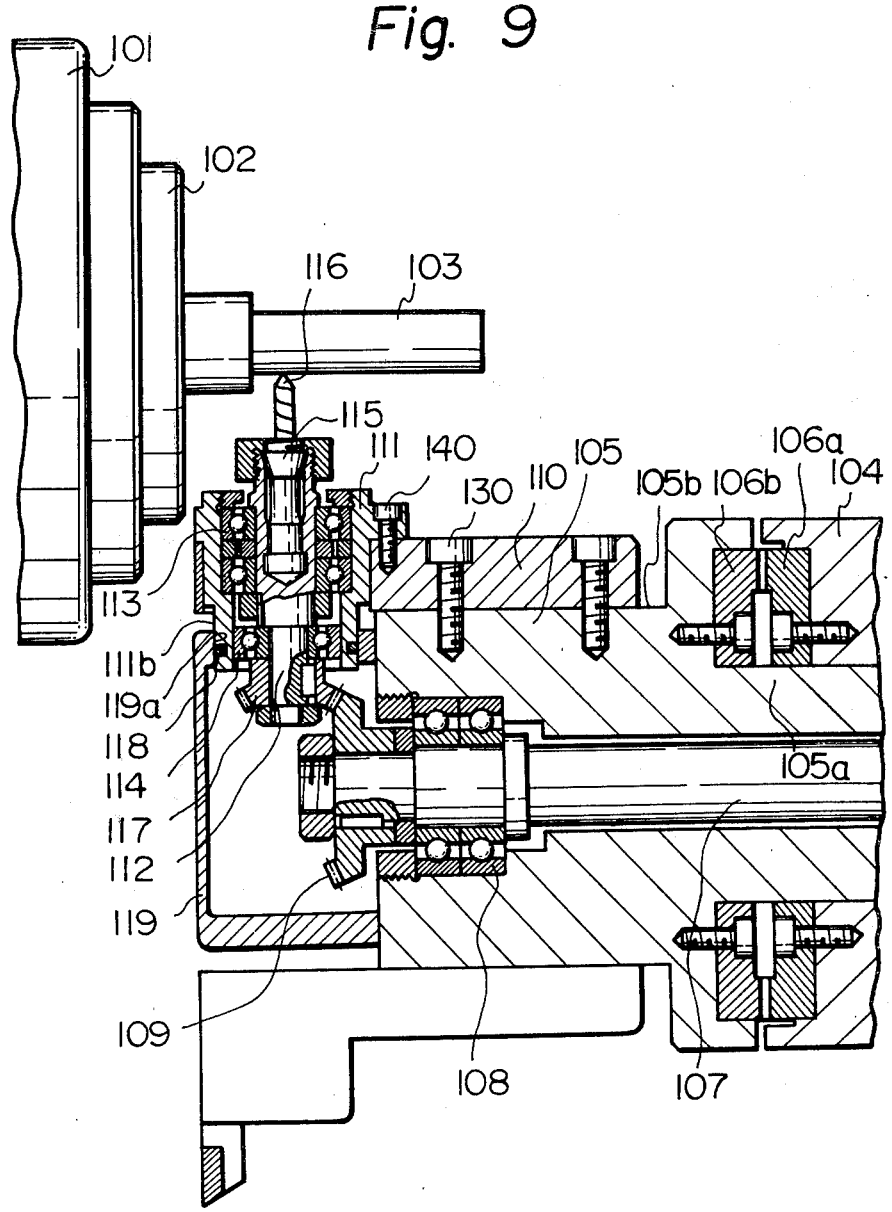
FIG. 9 shows a cross-sectional view of a tool spindle driving device according to the present invention.

FIG. 9 is a cross-sectional view illustrating an embodiment of a tool spindle driving device according to the present invention. Reference numeral 102 designates a spindle axially supported by the headstock 101 for rotation, the end of the spindle 102 having a collet chuck, which is not shown, for holding and rotating a bar-shaped workpiece 103. A turret carriage 104, slidably set upon a longitudinal slide rest which is not shown, is disposed so as to confront the heastock 101. A turret head 105 has a turret revolving shaft 105a which is received by the turret carriage 104, and possesses a polygonal columnar configuration having tool mounting faces 105b which are parallel to the center line of the spindle 101. The turret head 105 is indexed to any desired position by means of an indexing mechanism which is not shown, and is held in the selected position by a pair of couplings 106a, 106b, one fixedly secured to the turret carriage 104 and the other to the turret head 105 itself. Disposed on the axis of rotation of the turret head 105 is a tool spindle drive shaft 107 rotatively driven by a motor (not shown) and journalled for rotation in a bearing 108 accommodated within the turret head 105. Fixed to the end of the tool spindle drive shaft 107 is a driving bevel gear 109 which is so disposed as to extend toward the headstock side 101 from a position located forward of the front end face of the turret head 105. An dapting plate 110 is demountably secured to the tool mounting face 105b of the turret head 105 by means of a bolt 130. Mounted on the adapting plate 110 and secured by a bolt 140 is a housing 111 cooperating with the adapting plate 110 to construct a tool receiver. Reference numeral 112 denotes a tool spindle journalled in bearings 113, 114 fitted within the housing 111 and rotatable about an axis which perpendicularly crosses the axis of rotation of the turret head 105. Fitted on the tool spindle 112 is a collet chuck 115 for holding a tool such as a drill 116. A driven bevel gear 117 which meshes with the driving bevel gear 109 is secured to the tool spindle 112 on that side thereof opposite the tool such as the drill 116. The housing 111 that constructs the tool spindle holder is formed to include a shaft portion 111b which is concentric with the driven bevel gear 117 and which is provided with a groove that receives an O-ring 118. A cover 119 is fixedly secured to the front end of the turret head 105 to cover the meshing portions of the driving and driven bevel gears 109, 117, the cover 119 having a hole 119a provided through its circumference to permit the shaft portion 111b to be passed therethrough.

An example will now be described in which a transverse hole is drilled in the outer peripheral surface of a bar-shaped workpiece 103 with the tool spindle driving device described above. First, the spindle 102 is stopped to bring the workpiece 103 to rest. Next, the turret head 105 is revolved to index the drill 116 to the position where it can be applied to the workpiece 103, and is then locked in position by means of the couplings 106a, 106b. Thereafter the tool spindle drive shaft 107 is rotated, with the rotational motion thereof being transmitted to the tool spindle 112 through the meshing driving bevel gear 109 and driven bevel gear 117. This causes rotation of the drill 116 which drills the prescribed hole in the workpiece 103 as the turret carriage 104 is fed to transport the turret head 105 and, hence, the drill 116.

A malfunction can develop in the foregoing arrangement if the meshing portions of the driving bevel gear 109 and driven bevel gear 117 are left exposed to a working environment of scattering machining oil and cuttings. Such contamination within the cover 119 is precluded by the arrangement wherein the O-ring 118 is compressed between the shaft portion 111b of the housing 111 and the side of the cover 119 at the location of the hole 150 when the shaft portion 111b is passed through the hole 119a in mounting the tool shaft 112 on the turret 105.

Secondary functions such as a milling function or a transverse or eccentric hole drilling function may not be necessary. This will depend upon the intended shape of the half-finished workpiece. If such is the case, the bolt 130 is loosened and the adapting plate 110 removed to permit demounting of the tool spindle 112 from the turret head 105. A required lathe tool 120 can be mounted on the turret head 105 in place of the tool spindle 112.

There are also cases where the lathe never requires to be provided with secondary machining function that utilizes the tool spindle, but where only the simple lathe function is demanded.

Figure 10:
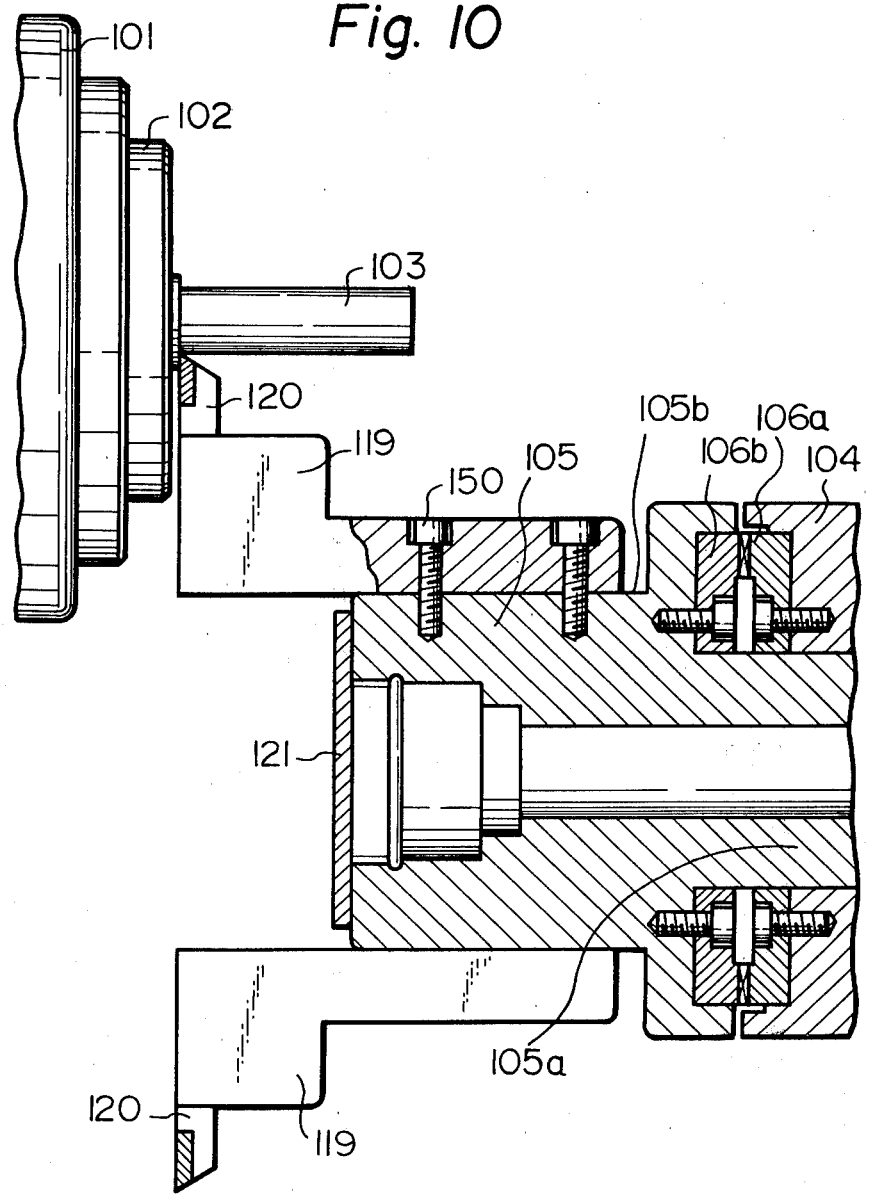
FIG. 10 shows a cross-sectional view of a turret from which the tool spindle driving device of FIG. 9 has been removed.

If this is the case the tool spindle drive shaft 107 and the driving bevel gear 109 are removed, as shown in FIG. 10, and a less expensive cover 121 is substituted for the cover 118.

In accordance with the present invention as described above, the driving bevel gear 109 projects forwardly of the front end face of the turret head 105, so that the turret head 105 need not be provided with a machined hole to gain access to the driving force obtained from the tool spindle drive shaft 107. Merely by applying machining to modify the hole that receives the bearing 108 and the female threads that secure the bearing makes it possible to realize an installable tool spindle driving device which permits a tool spindle 112 to be mounted to, and demounted from, the turret head 105.

Figure 11:
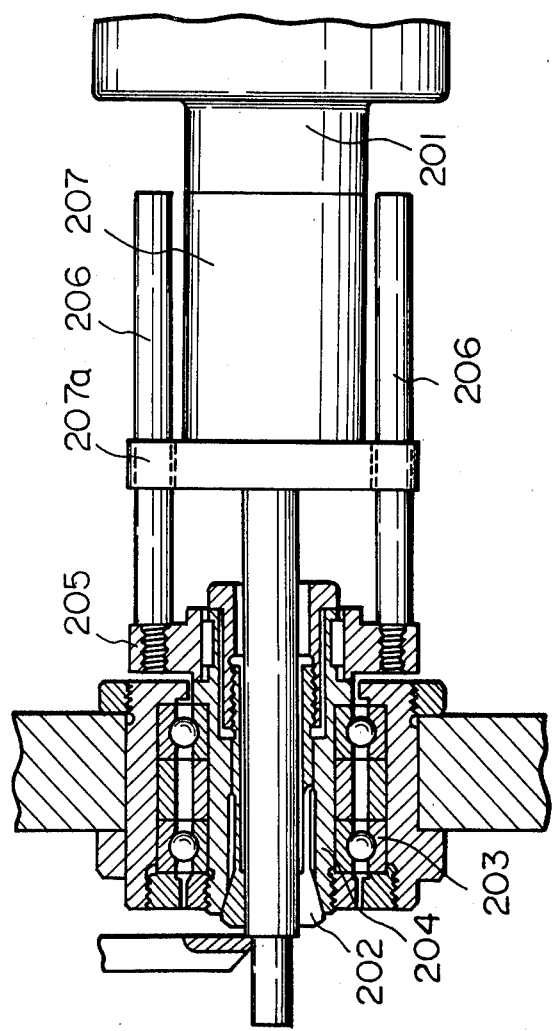
FIG. 11 shows a sectional view of a driving device for a rotary guide bush according to the prior art.

FIG. 11 shows a conventional dog-type driving device for driving the guide bush in synchronization with the spindle. The dog-type driving device has a disc 205 holding a guide bush disposed ahead of the spindle 201 concentrically with the latter, the disc 205 being fixed to a sleeve 204 carried by a bearing 203 and rotatable unitarily with the guide bush 202, dog rods 206, 206 connected to the disc 205 and extending in parallel with each other in a side-by-side relation, and a nut 207 screwed on the front end of the spindle 201 so as to retain the collet chuck on the latter, the nut 207 being provided with grooves 207a for receiving the dog rods 206. In operation, the rotation of the spindle 201 is transmitted to the guide bush through the dog rods 206. This driving device has quite a simple construction but is disadvantageous in that the dog rods 206 are biased outwardly away from each other due to centrifugal force as the rotational speed is increased.

The driving system incorporating a gear type transmission mechanism features improved safety during high-speed operation and a longer machining length in comparison with the dog-type driving device, but this system is structurally complex.

On the contrary, the present invention can provide a driving device for a rotary guide bush having a simple construction and capable of withstanding high-speed lathe operation.

Figure 12:
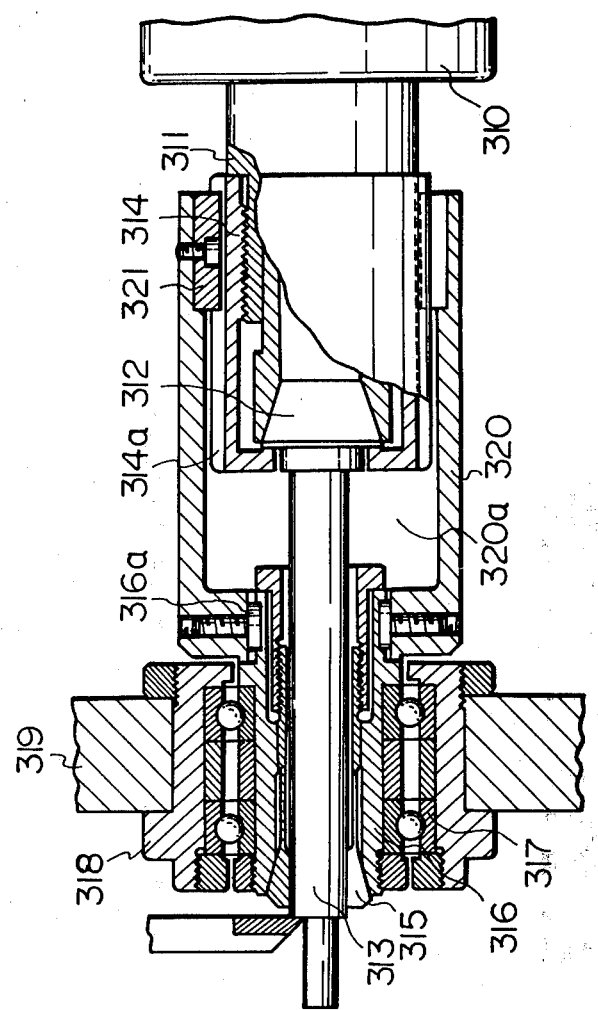
FIG. 12 shows a sectional view of a driving device for a guide bush according to the present invention.

Referring to FIG. 12 showing in section a driving device for a rotary guide bush constructed in accordance with an embodiment of the invention, a power-driven spindle 311 is mounted on a slidable headstock 310 and is adapted to rotate when driven by a suitable driving source. A collet chuck 312 fitted to the spindle 311 grasps a rod-shaped workpiece 313. A retainer nut 314 is screwed on the front end of the spindle 311 thereby to retain the collet chuck 312 on the spindle 311. A guiding groove 314a is formed in the peripheral surface of the nut 314 so as to extend in parallel with the axis of the spindle 311. A guide bush 315 disposed ahead of the spindle 311 concentrically with the latter receives and supports a rod-shaped member 313 disposed on the axis of the spindle 311. Reference numeral 316 designates a sleeve holding the guide bush 315 and journalled by bearings 317. The sleeve 316 is rotatable together with the guide bush 315. The bearings 317 are accommodated by a housing 318 which in turn is supported by a guide bush base 319.

A tubular member 320 fixed to the rear end of the sleeve 316 by means of a key has a bore 320a which loosely receives the retainer nut 314. A key member 321 fixed to the wall of the bore 320a of the tubular member 320 slidably engages the guiding groove 314a of the retainer nut 314.

The rotary guide bush driving device having the heretofore described construction operates in a manner explained hereinbelow.

The rod-shaped workpiece 313 is grasped by the collet chuck 312 and is received by the guide bush 315. As the spindle 311 is driven, the retainer nut 314 is rotated and the rotational motion is transmitted to the tubular member 320 through the key member 321 and further to the guide bush 315 through the sleeve 316 so that the guide bush 315 is rotated in synchronization with the spindle 311. In consequence, the slip in the rotational direction between the rod-shaped workpiece 313 and the guide bush 315 is eliminated and the seizure between these two members is completely avoided.

As the headstock 310 slides for feeding the rod-shaped workpiece 313, the spindle 311 is moved simultaneously. During this movement, the key member 321 transmits the rotational motion of the spindle 311 to the tubular member 320 while sliding along the guiding groove 314a.

As will be seen from the foregoing description, the rotary guide bush driving device of the present invention offers the following advantages. p (1) Safety during high-speed operation is improved as comared with the case of the conventional dog-type driving device, because the influence of the centrifugal force acting on the tubular member 320 is negligibly small.

(2) Since the influence of the centrifugal force is small, the length of the tubular member can be increased unless it is limited from the viewpoint of design, so that the maximum workable length of the workpiece is increased correspondingly.

(3) The construction is as simple as that of the conventional dog-type driving device.

Figure 13:
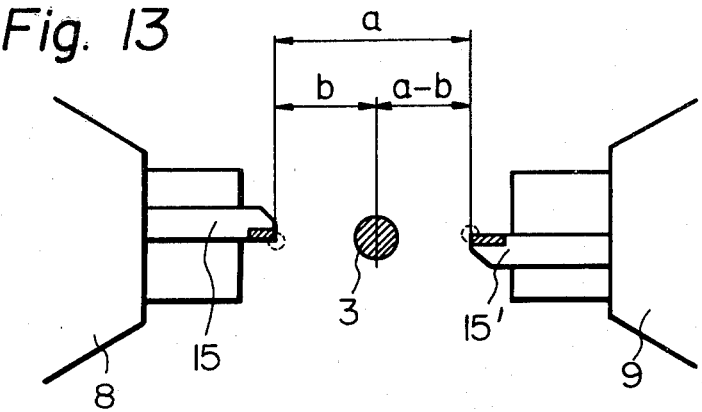
FIG. 13 shows the positional relationship between the spindle and the tool shown in FIG. 1.
Figure 14:
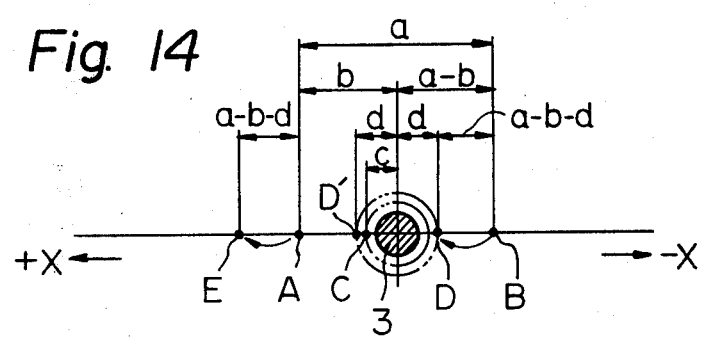
FIGS. 14 and 15 show the positional relationship between the spindle and tools, in model form.
Figure 15:
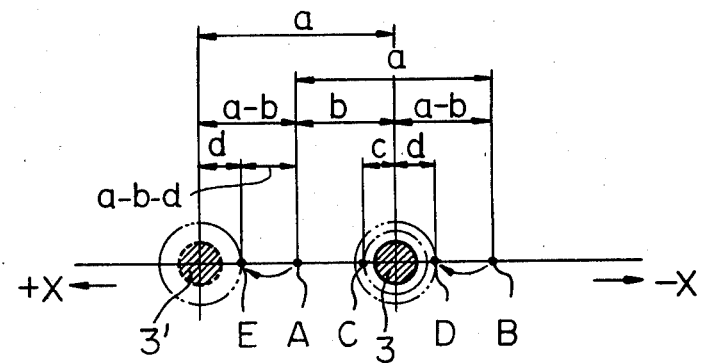

FIGS. 13, 14 and 15 illustrate the positional relationship between the spindle 3 and the cutting tools 15, 15' shown in FIG. 1. A setting is made such that a predetermined distance a is maintained between the edge of the cutting tool 15 and the edge of the cutting tool 15'. Therefore, when the edge of the cutting tool 15 is located at a distance b from the center of the spindle 3, the edge of the cutting tool 15' is located at a position B which is spaced from the center of the spindle 3 by a distance (a-b).

To facilitate the understanding of the invention, only the radial feed of the tools will be described, while neglecting the logitutinal feed of the same. Namely, the direction of movement of the cutting tools 15, 15' toward and away from the center line of the spindle 5, caused by the movement of the cross turret carriage 6, will be referred to as the "X-axis". The origin or zero point of this X-axis is placed at the center of the spindle 3. It is assumed that the negative direction along the X-axis is the direction of movement of the cutting tool 15 toward the spindle 3, i.e. the rightward direction as viewed in FIGS. 14 and 15. Namely, the direction of movement of the cutting tool 15 toward the spindle 3 is the positive direction along the X-axis, while the directions of movements of the cutting tool 15' toward and away from the spindle 3 are positive and negative directions along the X-axis.

FIG. 14 shows a model of turning work with this numerically controlled lathe, in which the cutting tool 15 is moved from a point A to a point C which is spaced by a distance C from the center of the spindle 3 to cut a cylinder having a diameter 2c, and is then returned to the position A to complete the operation. In such a case, according to the radius designating method in which an absolute command value for the displacement is given, the program is formed by designating the points to which the tools are moved as Xc and Xb along the X-axis as is well known. In the event that a cylinder of a diameter 2d is to be formed by the cutting tool 15' subsequent to the cutting of the first mentioned cylinder 2c, it is necessary to move the cutting tool 15' from the point B to a point D which is spaced by a distance d from the center of the spindle 3. To this end, according to the conventional programming method, it is necessary to give a command to move the cutting tool 15 from the position A by a distance corresponding to the distance between the point B and point D, i.e. (a-b-d). Namely, if the position of the point to which the tool is to be moved is input as X-d as in the case of the cutting tool 15, the cutting tool 15 is inconveniently moved from the point A to the point D. Also, if the point is designated by Xd, the cutting tool 15 is moved from the point A to the point D, so that cutting cannot be performed by the tool 15'.

Thus, in this case, it is necessary to shift the cutting tool 15 from the point A to the point E by inputting the value obtained from (a-b-d)+b=(a-b) as X(a-d), so that, as a result of the movement of the turret carriage, the cutting tool 15' is moved from the point B to the point D. Thus, the programming requires separate operations such as arithmetic operations, conversions of coordinate direction and so forth. This work is extremely troublesome and impractical.

Therefore, for moving the cutting tool 15' from the point B to the point D, after resetting the cutting tool the point A subsequent to the movement of the same from the point A to the point C, the coordinates of the point A as converted from Xb to X-(a-b) by a specific command code such as a G code. This corresponds to shifting the spindle 3 along the X-axis in the positive direction by a distance a. Namely, in this state, an imaginary spindle 3' has a center at a position which is spaced from the point A in the positive direction by a distance (a-b). Thus, thereafter, the X-axis of the coordinate is shifted to the first coordinate system having the origin located on the center of the spindle 3 to a new coordinate system, and the tool movement commands are given thereafter following this new coordinate system. According to this conversion of the coordinate, the relationship between the position of point A of the cutting tool 15 and the imaginary spindle 3' in the new coordinate system corresponds to the relationship between the position of point B of the cutting tool 15' in the first coordinate system and the actual spindle 3. Therefore, the cutting tool 15' can be moved from the point B to the point D by shifting the cutting tool 15 from the point A to the point E in the new coordinate system, by giving a command X-d.

In the conventional method in which the command is given on the basis of the cutting tool 15, the command for forming the cylinder having a diameter of 2c is given with the radius c treated as a positive value. However, in the method described hereinbefore, it is necessary to issue the command treating the radius as a negative value. This means that the programmer must change the sign of the command value, i.e. the convert of the direction of the coordinate separately. Thus, the burden of the programmer cannot be eliminated completely.

According to the invention, this problem is advantageously overcome, because the signs of all tool movement commands issued after the conversion of the coordinate values are inverted by the aforementioned specific code, e.g. the G code, so that the program can be formed irrespective of Xd and the replacement of the cutting tools.

The program thus prepared differs from the program of the aforementioned ordinary numerically controlled lathe having a single turret head only in that the specific code is inserted into the program. It will be seen that the machining program can be prepared simply substantially in the same manner as that of the ordinary numerically controlled lathe.

Needless to say, it is necessary to effect, by processing within the numerically controlled device, the conversion of the coordinate values and the inversion of sign, for actually conducting machining with this program. However, if the aforementioned value b is selected to be b=a/2, the conversion of the coordinate values can be made simply by inversion of signs, because of the relation expressed by -(a-b)=-b. In this case, this can be easily performed by the coordinate system setting function using the G code provided in the numerical control system, together with a mirror image function by the G code or an M code command.

As has been described, according to the present invention, the machining program for a numerically controlled lathe having a pair of turret heads can be prepared in the same simple manner as that in the preparation of the machining program for a numerically controlled lathe having a single turret head. In consequence, the programmer is relieved from the numerical calculation in programming, so that the time required for programming is shortened, to thereby reduce programming errors.

Figure 16:
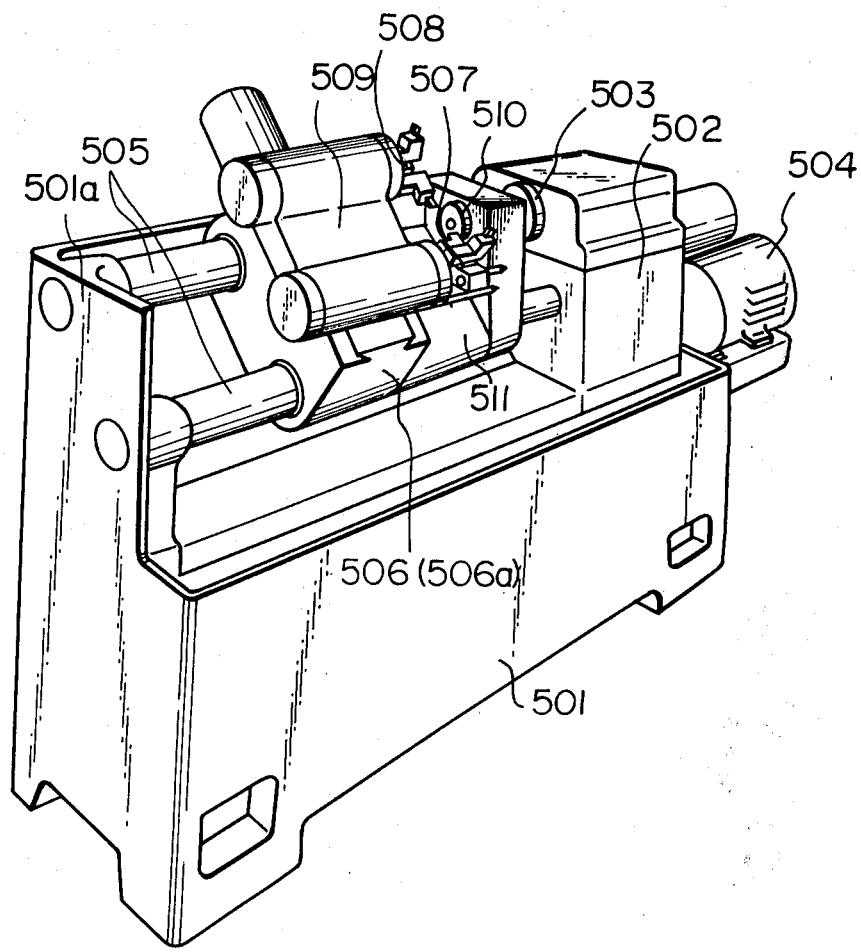
FIG. 16 shows another example of a numerically controlled automatic lathe according to the present invention.

FIG. 16 is a perspective view illustrating an another embodiment of the present invention. Disposed on the upper portion of a bed 501 at the right-hand side thereof is a headstock 502 that supports a spindle 503 for rotation. A spindle drive motor 504 rotatively drives the spindle 503 in the counter clockwise direction as viewed from the tool rest side. The bed 501 has a side wall 501a at the upper end of its left had side which cooperates with the headstock 502 to fixedly support two parallel guide bars 505 which extend from the side wall 501a to the headstock 502 and which lie in parallel with the spindle 503. Disposed on the guide bars 505 is a saddle 506 which is capable of sliding in a direction parallel to the spindle 503. A turret carriage 509 which slides in the transverse direction on the upper surface of the saddle 506. The turret carriage 509 carries a pair of turret heads 507, 508, one disposed on each side of the center line of the spindle so as to confront one another. In the present embodiment, the turret heads 507, 508 have axes of rotation which lie in parallel with the center line of the spindle, each turret head holding a plurality of tools such as cutters and drills. Since the guide bar on the front side of the lathe is disposed at a lower level that the back guide bar, the turret carriage 509 having the turret heads 507, 508 is slanted downwardly toward the front of the lathe. Suitable drive means such as a servo motor and feed screw are provided to control the sliding movement of the saddle 506 and turret carriage 509 in directions parallel to and perpendicular to the spindle, respectively. Suitable driving means such as a servo motor or hydraulic cylinder are provided for the turret heads 507, 508 to control their rotational motion.

The automatic lathe of the present embodiment is for working bar stock. Therefore a guide bush 510 is provided on the saddle 506 at the spindle side and is aligned coaxially with the spindle 503. The guide bush 510 travels together with the saddle 506 as the latter slides in the longitudinal direction. The bar stock or workpiece grasped by the spindle 503 is inserted through the guide bush 510 and is worked by the tools being held by the turret heads 507, 508. Formed between the guide bush 510 and the turret carriage 509 is a chip dropping wall 511 which is slanted downwardly toward the front of the lathe. This permits cuttings and chips produced by a cutting operation to drop away.

Figure 17:
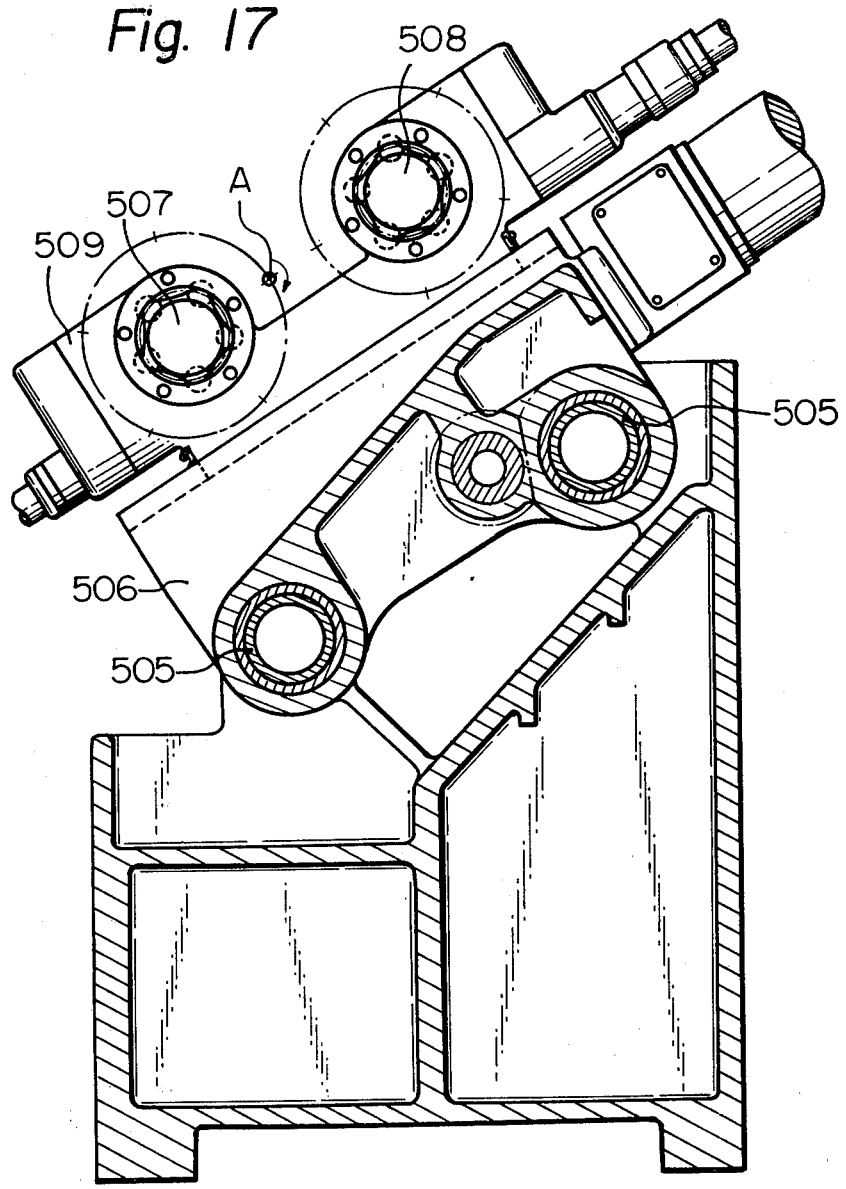
FIG. 17 shows a cross-sectional view of FIG. 16.

FIG. 17 is a cross-sectional view of the lathe cut along the chip dropping wall and viewed from the turret head side, and shows the conditions under which machining is performed by a cutting tool mounted on the turret head 507 which is on the front side (the left side in this Figure) with respect to the center line A of the spindle. As described above, the spindle rotates clockwise (counter-clockwise as viewed from the turret head side). The cutting tool being held by the turret head 507 is mounted with its cutting face oriented downwardly.

Figure 18:
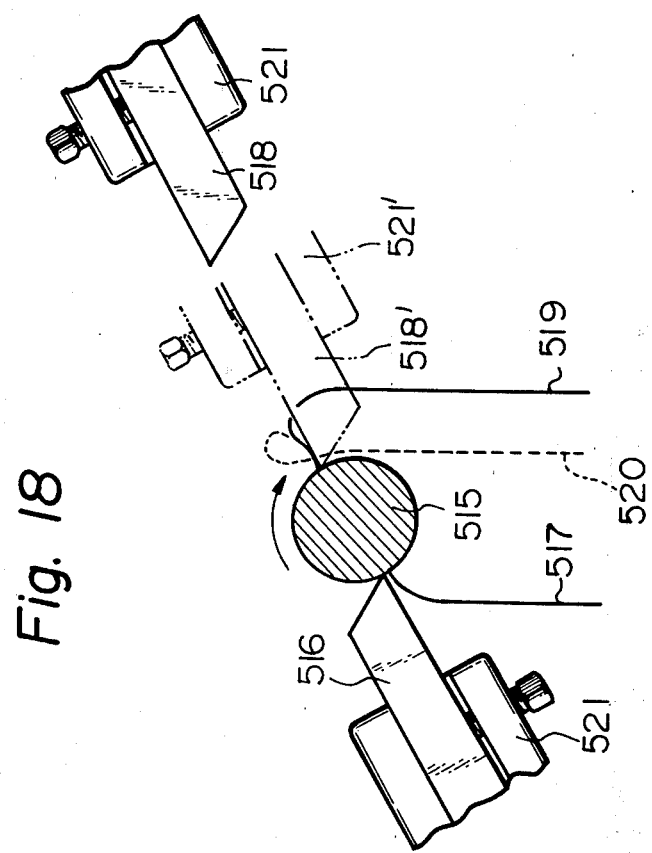
FIG. 18 shows an illustrative view showing how cuttings travel as they are cut from a workpiece.

FIG. 18 is an illustrative view showing how cuttings travel when a workpiece is cut by a cutting tool mounted on the automatic lathe having the structure and arrangement described above. When the workpiece 515 is cut by the cutting tool 516 located on the front side of the lathe, a cutting 517 travels downwardly as it comes off the workpiece, owing to the face that the cutting face of the tool 516 is downwardly oriented. It will be impossible for this cutting to become entangled with the workpiece 515 or tool 516. Meanwhile, when the cutting tool 518' mounted on the back side of the lathe cuts the workpiece, as shown by the phantom lines, the cuttings ordinarily travel as shown at 519, dropping over the side of the cutting tool 518'. This is because the cutting face of the tool 518' is upwardly oriented. Since the cutting face of the cutting tool 518' is upwardly inclined, even cuttings which attempt to move along its upper edge tend to fall off from the sides thereof with relative ease, and the cuttings almost never reach the tool receiver 521' mounted on the tool rest.

Cuttings which tend to curl also fall along a patch indicated at 520 and do not travel along the surface of the tool 518' since it is upwardly inclined.

Thus, as described above, the present invention is particularly applicable to automatic lathes that run unattended for long periods of time, since cuttings can be readily discharged virtually without fear of them becoming entangled with tools or tool holders.

What is claimed is:

1. A numerically controlled lathe, comprising:
   a stationary headstock;
   a spindle supported in said headstock for rotational movement;
   first guideway means located in front of said headstock, extending horizontally and parallel to the axis of said spindle;
   a saddle horizontally movable on said first guideway means relative to said spindle, said saddle including second guideway means extending perpendicular to said first guideway means;
   a cross slide slidably supported by said second guideway means and movable in a direction perpendicular to said first guideway means;
   first and second tool posts supported by said cross slide and located in opposing relationship with respect to the axis of said spindle, said first and second tool posts including turret heads, respectively, each carrying a plurality of tool receivers;
   turret indexing means allowing indexing of one of said turret heads while a tool of the tool receiver of the other one of turret heads is in a cutting position relative to the axis of said spindle;
   a guide bush;
   a guide bush supporting member located between said spindle and said first and second tool posts and connected to said saddle for horizontal movement therewith, said supporting member supporting said guide bush in concentric relation with the axis of said spindle; and
   detecting means for detecting when a tool of the tool receiver of the other one of said turret heads is in said cutting position relative to the axis of said spindle;
   said turret head of said first tool post and said tool receiver of said second tool post including axes extending parallel to the axis of said spindle and being located between said guide bush supporting member and adjacent ends of said first and second tool posts in an area away from said second guideway means;
   each of said turret heads having a plurality of tool mounting faces circumferentially spaced apart about the axis of said turret head, with the number of the tool mounting faces being of n number of an odd number; and
   said turret indexing means comprising cylinder means, piston means movable in said cylinder means to $(n+1)/2$-number of stopping positions to effect indexing of each of said turret heads at a plurality of indexing positions, stopper means mounted to said cylinder means to cause said piston means to stop at said stopping positions, and adjusting means cooperating with said stopper means to effect adjustment of said stopper positions relative to said indexing positions, gear means provided between each of said turret heads and said cylinder means to permit the engagement therebetween, and means for shifting said gear means into and out of engagement.

2. A numerically controlled lathe according to claim 1, in which said tool mounting faces of said turret heads are five in number, and in which the stopping positions of said cylinder means are three in number.

3. A numerical controlled lathe according to claim 1, in which said gear means comprises a first gear rotatable with said turret head and having a number of teeth which is an integral multiple of n, a second gear rotated by said cylinder means and having any number of teeth.

4. A numerically controlled lathe, comprising:
   a stationary headstock;
   a spindle supported in said headstock for rotational movement;
   first guideway means located in front of said headstock, extending horizontally and parallel to the axis of said spindle;
   a saddle horizontally movable on said first guideway means relative to said spindle, said saddle including second guideway means extending perpendicular to said first guideway means;
   a cross slide slidably supported by said second guideway means and movable in a direction perpendicular to said first guideway means;
   first and second tool posts supported by said cross slide and located in opposing relationship with respect to the axis of said spindle, said first and second tool posts including turret heads, respectively, each carrying a plurality of tool receivers;
   turret indexing means allowing indexing of one of said turret heads while a tool of the tool receiver of the other one of said turret heads is in a cutting position relative to the axis of said spindle;
   a guide bush;
   a guide bush supporting member located between said spindle and said first and second tool posts and connected to said saddle for horizontal movement therewith, said supporting member supporting said guide bush in concentric relation with the axis of said spindle; and
   detecting means for detecting when a tool of the tool receiver of the other one of said turret heads is in a cutting position relative to the axis of said spindle;
   said turret head of said first tool post and said tool receiver of said second tool post including axes extending parallel to the axis of said spindle and being located between said guide bush supporting member and adjacent ends of said first and second tool posts in an area away from said second guideway means;
   each of said turret heads has a plurality of tool mounting faces equally spaced apart about the axis of each of said turret heads; and
   said turret indexing means being utilized for indexing each of said turret heads and comprising cylinder means having $(n+1)/2$-number of stopper means relative to an odd number n of indexing positions, first gear means provided between one of said turret heads and said cylinder means for permitting the engagement therebetween, second gear means provided between the other one of said turret heads and said cylinder means for permitting the engagement therebetween, and means for shifting said first and second gears in and out of engagement.

5. A numerically controlled lathe according to claim 4, in which said tool mounting faces of said each of said turret heads are five in number, and in which the stopping positions of said cylinder means are three in number.

6. A numerically controlled lathe according to claim 4, in which each of said first and second gear means comprises a first gear rotatable with each of said turret heads and having a number of teeth which is an integral multiple of n, a second gear rotated by said cylinder means and having any number of teeth.

7. A numerically controlled lathe according to claim 4, said turret indexing means further comprises piston means slidable in said cylinder means at said stopping positions, said stopper means mounted to said cylinder means to define said stopping positions, and adjusting means cooperating with said stopper means to enable adjustment at said stopper positions relative to said indexing positions.

* * * * *